(12) United States Patent
Claiborne

(10) Patent No.: US 6,765,688 B1
(45) Date of Patent: Jul. 20, 2004

(54) GENERIC METHOD OF DEFINING A WATERMARK FOR BOTH PRINT AND COPY

(75) Inventor: Steven J. Claiborne, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/499,704

(22) Filed: Feb. 8, 2000

(51) Int. Cl.[7] .......................... G06F 15/00; H04N 1/40
(52) U.S. Cl. .................. 358/1.18; 358/1.2; 358/3.14; 358/3.28; 382/100
(58) Field of Search ................ 358/1.18, 1.2, 358/1.3, 3.14, 3.28, 3.03; 382/100, 237, 162; 380/51, 235, 462.11; 283/13, 17, 93, 94, 113

(56) References Cited

U.S. PATENT DOCUMENTS

| 5,337,361 A | * | 8/1994 | Wang et al. | .................. 380/51 |
| 5,689,626 A | | 11/1997 | Conley | ........................ 395/117 |
| 5,859,954 A | | 1/1999 | Toda | .......................... 395/102 |
| 6,526,155 B1 | * | 2/2003 | Wang et al. | ................ 382/100 |

FOREIGN PATENT DOCUMENTS

JP      11-0232259      8/1999

OTHER PUBLICATIONS

Hewlett–Packard Application; filed Sep. 24, 1997, U.S. patent application. Ser. No. 08/936568.
Copy of EP Search Report, Jul. 13, 2001.

* cited by examiner

Primary Examiner—Twyler Lamb

(57) ABSTRACT

A method for generating a secondary image, being a first body of data from an initial document, onto a second body of data from the initial document, to produce a final document. The method includes identifying within the initial document the first and second bodies of data. The initial document is then formatted into an initial digital document file capable of being processed by the document producer into the final document. The first body of data is stored in a computer readable memory as a secondary image data file, and the second body of data is stored in the memory as a primary image data file. The secondary image data file and at least a portion of the primary image data file are then combined in the document producer to generate a digital page of the finished document, which is then generated by the document producer as the final document.

20 Claims, 9 Drawing Sheets

GENERIC METHOD OF DEFINING A WATERMARK FOR BOTH PRINT AND COPY

FIELD OF THE INVENTION

This invention pertains to methods for generating watermarks and overlays on printed and photocopied documents.

BACKGROUND OF THE INVENTION

Most applications software nowadays comes with the capability for generating and printing watermarks on documents. A watermark is generally understood to mean an object, such as text or a graphics image, which lies in the background behind the primary page content. For example, a watermark can consist of the word, "CONFIDENTIAL" which is printed in light gray at a diagonal across the page of a document which the author considers to be confidential. The text of the document, being the primary page content, is then printed over the top of the watermark. Likewise, graphics images, such as the image of a flower, can be produced and printed in the background of each page of a document. In printing the document, the watermark and the primary page content are printed at the same time, and it is only the shading or page content placement which makes the watermark appear to be in the background.

In reality, the "background effect" is achieved by temporal ordering of the data in the computer memory which comprises the primary page content and the watermark. That is, when page content exists (such as text) which occupies the same pixel as the watermark, the page content overwrites the watermark in the computer memory. This can be achieved by first storing the watermark in the computer memory in a pixel-by-pixel matrix, and then subsequently storing the page content to the same matrix. When the page content occupies the same pixel in the matrix as the watermark, the watermark data for that pixel is overwritten with the page content for the same pixel.

One example of word processing application software which has the capability for placing a watermark on the pages of a document is WordPerfect® (at least release 8.0 and higher), available from Corel Corp. WordPerfect® also offers users a variety of options relating to the use of the watermark, such as using watermark graphics files beyond those provided with the program itself, and placement, shading and coloring options. Likewise, the word processing application software Word, from Microsoft Corp., offers similar watermark options.

Certain applications software also offers the capability for generating and printing overlays on documents. An overlay is generally understood to mean an object, such as text or a graphics image, which lies in the foreground in front of the primary page content. For example, someone printing a specimen check may want to print the word, "SPECIMEN" diagonally across the face of the check to insure that it is clear that the check is a specimen, and not a real check which can be cashed.

For current applications software having the capability to generate watermarks and overlays, the software generates each page to be printed as a complete page, including the watermark or the overlay. The software then communicates each compiled page to the printer where the page is stored in temporary memory until the page is printed. The applications software works in conjunction with a printer driver, which is software particular to the printer, and which typically resides in the same processing unit (such as a personal computer) as does the applications software. Printer drivers are typically proprietary software provided by the manufacturer of the printer, and are normally specific to the particular model of printer. The printer driver interacts with software which is resident within the printer itself, typically in the form of firmware (i.e., software programmed onto a microchip). The printer driver configures the data from the applications software into a format which can be used by the printer, and the printer software converts the formatted data into a form which can be processed by the printer to generate the printed image.

Since current applications software requires that each page bearing a watermark or an overlay be sent to the printer as a complete page, including the watermark or the overlay, the size of the print file sent to the printer can be quite large. If the watermark or overlay is a graphic image to be printed on each page, the watermark or overlay can easily constitute the biggest portion of the total file in terms of kilobytes. Consequently, the printer driver and the printer software must process a considerable quantity of data when printing such a file, which has the effect of slowing the printing process. Further, many printers are configured with limited memory, and so it may not be possible for the printer to store the entire file to be printed in its memory. In the latter instance, the computer generating the image to be printed can be effected, since the image must be retained in random access memory (RAM) of the computer while it is queued to be sent to the printer. This can slow up the computer while the document is being printed.

In addition to applications software itself providing the capability for generating watermarks, some printer drivers are also configured with this capability. In this instance, the user can access the printer driver's capabilities from the printer control panel (i.e., the software interface available to the user typically on the user's computer or "desktop"). Printer driver options can also frequently be accessed through the applications software's print command menu. When the printer driver provides the watermark, the process is similar to the application software providing the watermark. That is, each page of the document to be printed with the watermark is further provided with the watermark prior to being transmitted to the printer. Consequently, printer driver-provided watermarks suffer from the same drawbacks as applications software-provided watermarks, resulting in a large amount of data being communicated to the printer, with concomitant effects on the speed of the printing function.

FIG. 1 graphically depicts the limitations of the prior art in printing documents containing a watermark. As shown in FIG. 1, a processing unit 1, as for example a personal computer, contains applications software for generating an initial document 10 and a secondary image 12, such as a watermark, to be applied to the initial document. Typically, the watermark is applied to each page of the initial document, although this can usually be varied using the applications software. The applications software for generating the initial document 10 and the secondary image 12 can be the same program or different programs.

After the initial document 10 and the secondary image 12 are identified, the final document format 2 is compiled, typically in the applications program used to generate the initial document 10, and as a result of the user electing to apply the watermark to the initial document. Once the user requests that the final document be printed, the final document format is then provided to the printer driver program 7, which formats the final document in a format compatible with the particular printer. The printer compatible file is then sent to the printer for printing. A graphical image of the final document in a format compatible with the particular printer is shown in FIG. 1 as item 3, which, as shown, comprises a multi-page document. As shown in FIG. 1, the finally formatted document 3 comprises a first page 4, a second page 5, and so on to an "nth" page 6, all to be printed with the secondary image. As indicated, each page of the file 3 sent to the printer 14 contains not only the page content from the initial document for that page, but the secondary image as well. Thus, the secondary image is transmitted to the printer "n" times (one time for each page to be printed with the secondary image). Because the printer must store each page of the final print file 3; it is apparent that much redundant information in the way of the secondary image is being transmitted to the printer, consequently slowing the printing process.

Some photocopiers also provide watermark options which can be selected from the control panel of the copier. Typically, the selection of watermarks from a photocopier is quite limited as compared to applications- or printer driver-provided watermarks. For example, a copier may only offer a watermark comprising, "CONFIDENTIAL", which can only be positioned on one or a very limited number of positions on the page. Once the watermark is selected from the control panel of the photocopier, the watermark is generated on each and every page of the copied originals. At this time, photocopiers do not offer overlay capabilities.

U.S. Pat. No. 5,715,382 to Herregods, et al. ("the '382 patent) describes an efficient method for printing a foreground over a background. The background image is produced by a first application software program and then stored in computer readable memory within a printer. The overlay, or foreground image, such as text and the like, is generated by a second application software program and is also stored in the computer readable memory in the printer, although in a different location than the background image. The printer then combines the page or pages of the foreground image with the background image to produce a composite image, which is then printed. The '382 patent further describes a method for half-tone rendering of overlapping background and foreground pixels to give a transparency appearance to common pixels.

U.S. Pat. No. 5,729,665 to Gauthier ("the '665 patent") describes an efficient method for printing names and the like from a database onto a background image generated by an applications software program. Specifically, a background image is generated as a PostScript file by a first applications software program. This PostScript file is then transmitted to the printer. The printer then acquires secondary files from a database program separate from the applications software used to generate the background image. The background image and the secondary files from the database are then merged, a file at a time, to generate a composite image which is then printed.

U.S. Pat. No. 5,859,954 to Toda ("the '954 patent") describes an efficient method for rendering a background image with a printer. The background image is saved as various component parts in computer readable memory resident within the printer. Each component part is represented in a format selected to render the part in the most efficient manner. The component parts are then combined by printer software to generate the final background image for printing.

Both the '382 patent and the '665 patent describe efficient methods for printing a foreground generated by a first applications software package with a background generated by a second applications software package. On the other hand, the '954 patent described an efficient method for rendering a background image, but does not address applying an overlay on the image. Consequently, what is needed then is a method for providing a wide selection of watermarks and overlays which can be generated on printed and photocopied documents, which does not appreciably slow the printing or copying process, and which allows the watermarks and overlays to be generated by the same applications software package as is used to generate the varying primary page content.

SUMMARY OF THE INVENTION

The invention includes methods and apparatus for efficiently generating a secondary image contained within an initial document onto a subsequent portion of the initial document to thereby produce a final document page to be created by a document producer. The secondary image can include one or both of a watermark and an overlay. The document producer can include a printer, a copier, and a facsimile machine.

A first embodiment of the invention includes a method for generating such secondary images on final pages of a document with a document producer. The initial document is provided to the document producer either as a data file or a tangible document form. The method includes the step of identifying a first body of data within the initial document to be used as the secondary image. A second body of data within the same initial document is identified to be used as the subsequent portion of the initial document. The initial document is then formatted into an initial digital document file capable of being processed by the document producer into at least part of the final document. The portion of the initial digital document file which is the first body of data is stored in a computer readable memory as a secondary image computer readable data file, and a portion of the initial digital document file comprising the second body of data is stored as a primary image computer readable data file. The secondary image computer readable data file and at least a portion of the primary image computer readable data file are then combined using a computer processor to generate a digital representation of at least one page of the finished document. The digital representation of the at least one page of the finished document is then generated in final form.

The invention further includes apparatus for implementing the above described method. In a second embodiment, the invention includes an apparatus for generating a secondary image contained within an initial document onto a subsequent portion of the initial document to produce a finished document page. The apparatus includes a computer processor having an applications software program configured to generate the initial document. The apparatus further includes computer readable computer memory and a printer driver program. The apparatus also has a printer which includes a printer control processor, computer readable printer memory, and a print engine configured to print the finished document. The printer is in electronic communication with the computer processor.

In the apparatus of the second embodiment, the printer driver program comprises a series of computer executable steps for (i) communicating a first portion of the initial document identified as the secondary image from the computer to the printer memory as a secondary image computer readable file, and (ii) communicating a second portion of the initial document identified as the subsequent portion of the initial document from the computer to the printer memory as a page content computer readable file. The printer control processor of the apparatus is configured to read from the printer memory the secondary image computer readable file and at least a portion of page content computer readable file, and to selectively combine them to generate a digital representation of the finished document page. The printer control processor is configured to then transmit the digital representation of the finished document page to the print engine for printing as the finished document page.

In a third embodiment, the invention includes a copier for reproducing an image from a selected page of a multi-page document onto a subsequent page of the document to thereby produce a finished document page. The copier includes a scanner configured to scan a page of a document containing page content and convert the scanned page content into a distinct digital file. The copier also includes computer readable memory configured to store digital files of page content. The copier has a sheet feeder configured to sequentially feed a plurality of sheets of the multi-page document to the scanner, and a print engine configured to print the finished document page. The copier is provided with a computer processor configured to send and retrieve digital files from the computer readable memory and execute steps of a computer program. A copier program, which can be resident within the copier itself or supported on an external computer, includes a series of computer executable steps for reading and selectively combining the digital files of the selected page and the subsequent page of the multi-page document from the computer readable memory to produce the finished document page. The finished document page is then transmitted to the print engine for printing.

The invention allows the efficient application of watermarks and backgrounds to an initial document, beyond the capability currently provided by applications software, yet still using a single applications software program. Further, the invention allows the advanced application of watermarks and backgrounds to a tangible document to be photocopied.

DETAILED DESCRIPTION OF THE INVENTION

Figure 1:
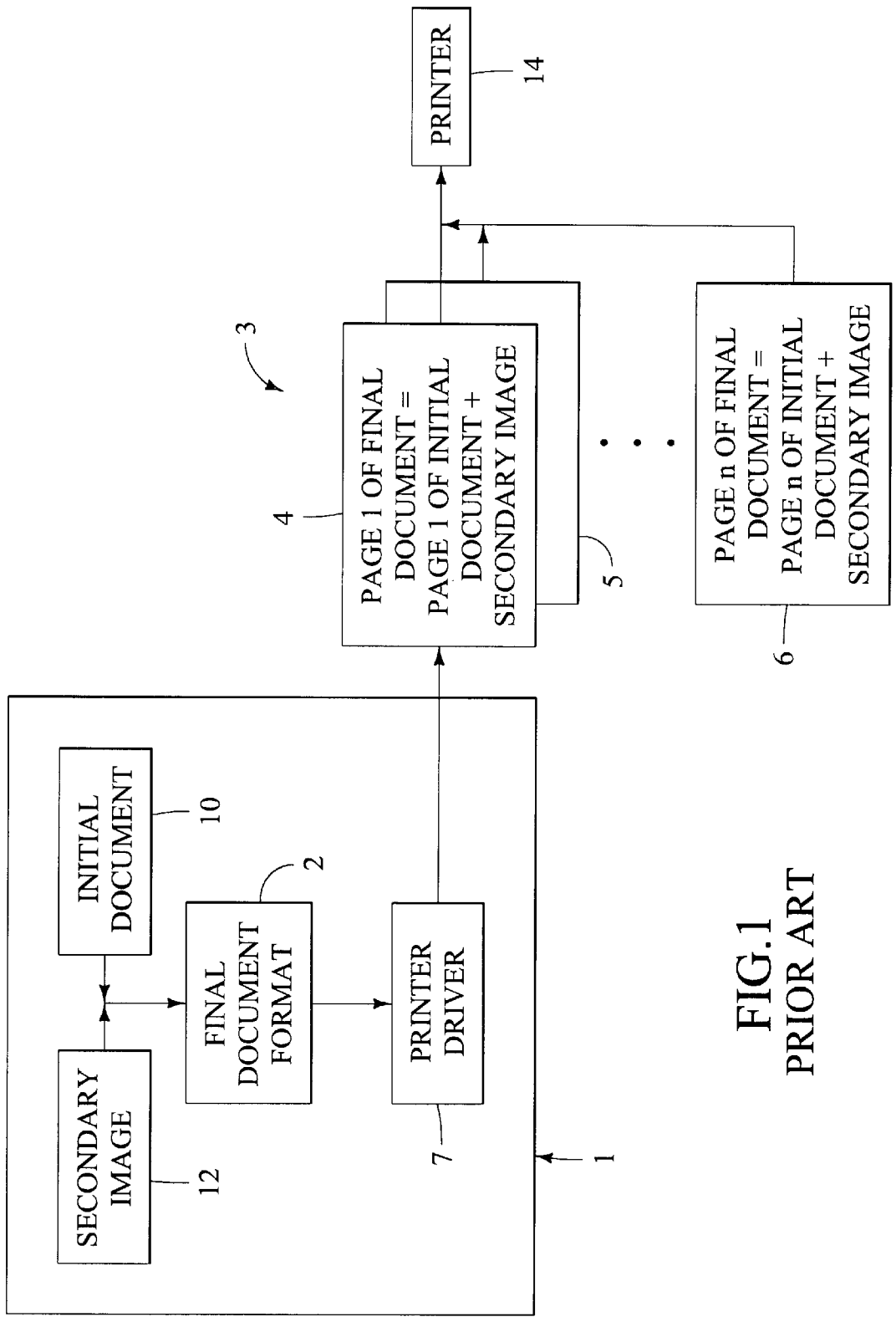
FIG. 1 is a schematic diagram showing a watermark printing process of the prior art.

The following invention can be used with dedicated printing apparatus such as laser printers or ink jet printers, as well as photocopiers and facsimile machines. The invention can also be used with multi-function printing apparatus which allow one device to be used for printing and copying, and can also be used to send and receive facsimiles. I will use the expression "document producer" as a generic expression to encompass all of these apparatus, individually and collectively. When I use the expression "printer", I intend an apparatus having at least the capability to print a document in tangible form from a data file provided by a computer processing unit such as a personal computer. When I use the expression "copier" or "photocopier", I intend an apparatus having at least the capability to make a copy in tangible form from a tangible original document. More specifically, I intend a "copier" to have the capability of converting a tangible image to be copied to a digital form as a computer readable data file, and then producing the copied image from the data file. When I use the expression "facsimile apparatus", "facsimile machine", "fax machine" or "fax", I intend an apparatus having at least the capability to transmit a document either in original tangible form or as a data file via a telecommunication medium, and reproduce the document on a recipient end of the telecommunication medium in either tangible form or as a data file.

Further, the invention is applicable to watermarks as well as overlays. Watermarks are generally understood to mean objects, such as text or a graphics image, which lie in the background behind the primary page content. Overlays are generally understood to mean objects, such as text or a graphics image, which lie in the foreground in front of the primary page content, but can also lie in the background behind the primary page content. I will use the expression "secondary image" generically to mean both watermarks and overlays, either separately or in combination. By "page content" I mean the primary information, separate from the secondary image, which is to be conveyed by the document, and which generally varies from page to page. Generally, but not always, a watermark or an overlay does not vary from page to page of a document. The invention further includes documents having both watermarks and overlays, either on separate pages or on the same page of the document.

The invention can encompass both documents provided to the document producer in the form of a data file, or documents provided to the document producer in tangible form. An example of the former is a document being communicated from applications software, such as word processing software, to a printer. An example of the latter is a printed document being provided to a photocopier for copying. By "document" I mean any formatted page or collection of pages which comprises information, including without limitation, information in the form of text and images.

In the following discussion, when I describe a page of the finished document being produced in "final form", I mean a page of the document including any watermarks and/or overlays, in the final form intended, as well as the primary page content. When the image producer is a printer or a copier, the final form will typically be a tangible form such as printed paper. When the image producer is a facsimile machine, the final form can be either tangible form printed out at the receiving end, or a data file saved to computer readable memory at the receiving end.

In general, the invention comprises methods and apparatus for efficiently generating a secondary image contained within an initial document onto a subsequent portion of the initial document, and thereby produce a final document page to be created by a document producer. The initial document is provided to the document producer either as a data file or a tangible document form. The method includes the step of identifying a first body of data within the initial document to be used as the secondary image. A second body of data within the same initial document is identified to be used as the subsequent portion of the initial document. The initial document is then formatted into an initial digital document file capable of being processed by the document producer into at least part of the final document. The portion of the initial digital document file which is the first body of data is stored in a computer readable memory as a secondary image computer readable data file, and a portion of the initial digital document file comprising the second body of data is stored as a primary image computer readable data file. The secondary image computer readable data file and at least a portion of the primary image computer readable data file are then combined using a computer processor to generate a digital representation of at least one page of the finished document. The digital representation of the at least one page of the finished document is then generated in final form.

Figure 2:
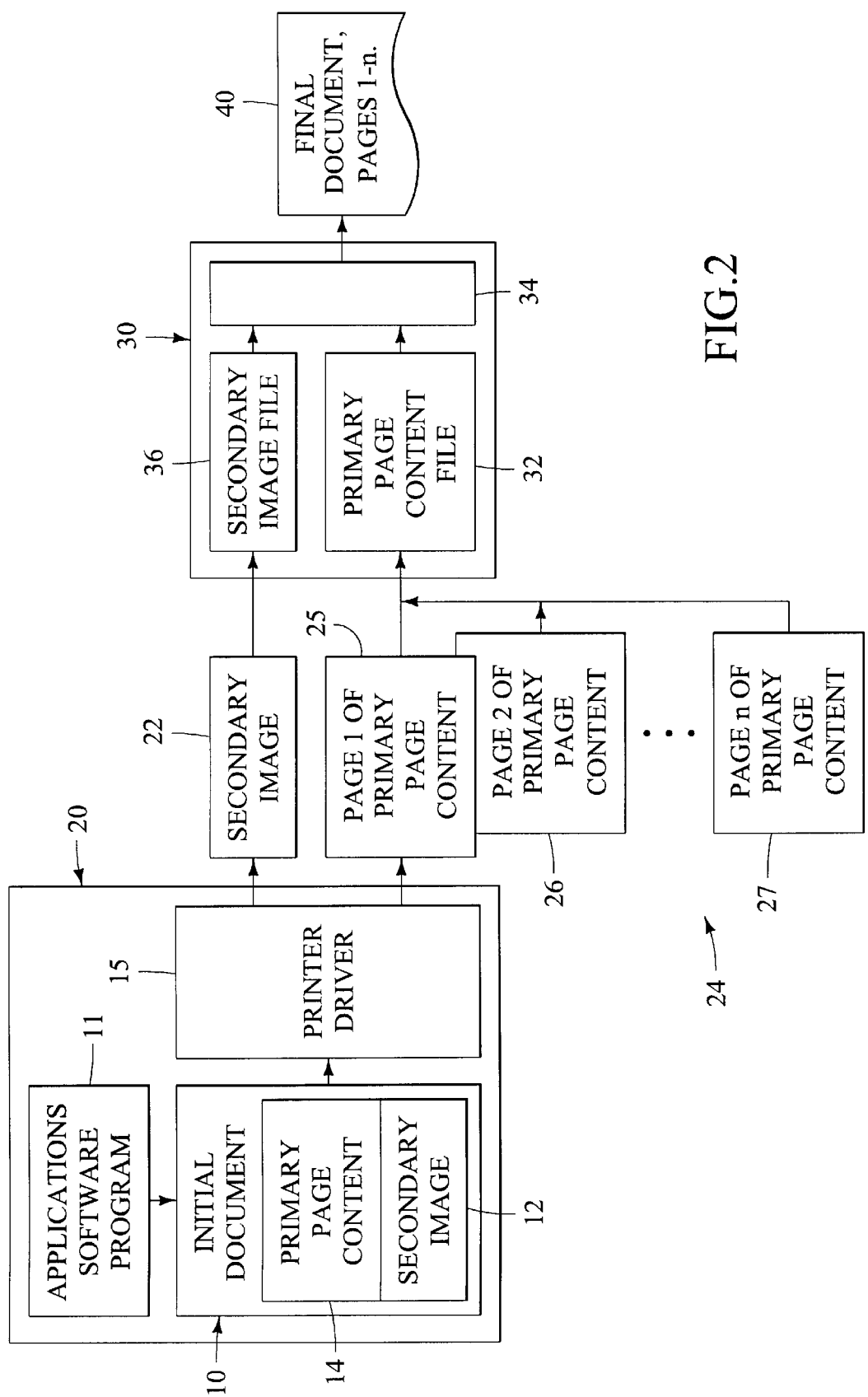
FIG. 2 is a schematic diagram depicting a watermark printing process using a computer and a printer, in accordance with the method of the present invention.

Turning to FIG. 2, a schematic diagram depicting a printing process using the method of the present invention is shown. FIG. 2 can be compared with the prior art method depicted in FIG. 1. In FIG. 2, using a computer 20, a user generates an initial document 10 using a software applications program 11. The initial document 10 comprises a secondary image 12 which is to be applied to selected pages of the initial document in final form, as well as primary page content 14, which comprises the subsequent portion of the document to which the secondary image is to be applied. For example, the secondary image 12 can comprise the first page of the document, and the subsequent portion of the document 14 can comprise a plurality of pages to which the secondary image is to be applied. Examples of applications software programs which can generate a document in this format include the aforementioned Microsoft Word and Corel WordPerfect, as well as Microsoft Excel (a spreadsheet program), Microsoft PowerPoint (a presentation program), and Acrobat by Abode Systems Inc. (software used to generate documents having the appearance of published documents). Once the initial document 10 is generated or identified, and the portion of the initial document comprising the secondary image 12 is selected by a user, the user generates a command to print the final document comprising the secondary image applied to each designated subsequent page 14 of the initial document 10. The print command then accesses a set of computer executable steps for performing the printing of the final document. This set of computer executable steps will hereinafter be known as the "print program". The print command can either be accessed from the applications software 11, or it can be accessed directly through the printer driver program 15. The print program can be embedded in the applications program, the printer driver program, or elsewhere. For purposes of the following discussion, it will be assumed that the print program is embedded within the printer driver program 15.

The print program accesses that portion of the initial document 10 which comprises the secondary image 12, and generates therefrom a secondary image print file 22 which the print program communicates a single time to the printer 30. The printer is preferably instructed by the print program to save the secondary image print file 22 as a macro, which is a set of print instructions which can be executed repeatedly over merely by "playing" the macro (i.e., by executing or running the set of computer executable instructions which comprise the macro). The macro can be configured by the print program to print the secondary image in the manner most efficient for the printer. For example, if the secondary image comprises a geometrical image such as a circle or an ellipse, then the macro can be configured to generate the geometrical image according to a mathematical formula, rather than saving the geometrical image as a series of pixels which will generate the geometrical image.

The print program also accesses the subsequent portion 14 of the initial document 10 and generates therefrom an initial document print file 24, which comprises selected subsequent pages of the initial document. The printer 30 saves the selected subsequent pages as file 32 in the printer's memory (or at least as much as can be contained in the printer's memory). Rather than include the secondary image on each subsequent page of the initial document which is to contain the secondary image, the print program merely identifies to the printer those subsequent pages of the initial document which are to contain the secondary image. The printer control program in the printer then combines each designated page of the initial document with the secondary image to generate compiled digital images of the pages of the final document. These compiled digital images of the final document pages are then transmitted to the print engine 34 in the copier, where they are printed as the final document 40. The final document thus contains the primary page content of the initial document and the secondary image printed onto each of the selected pages.

Although I use the expression "subsequent pages" of the initial document to refer to those pages other than the page containing the secondary image, it is understood that this expression does not limit the subsequent pages to being in any particular order or position within the initial document. For example, the initial document can be a 10 page document, and the first page comprises the secondary image. In this case, the "subsequent pages" are pages 2–9. However, the secondary image can also be the last page, in which case the subsequent pages are pages 1 through 9.

Figure 3A:
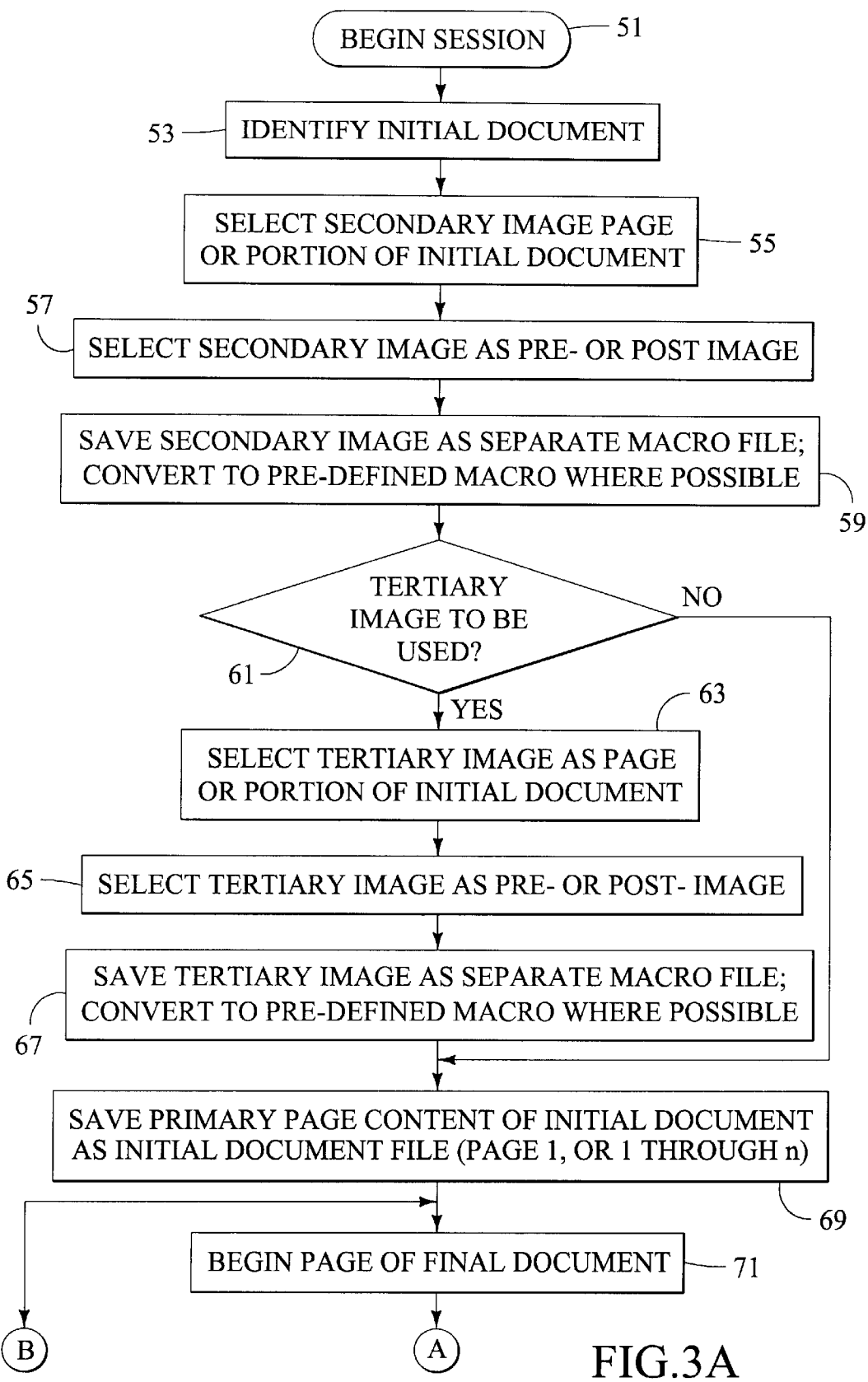
FIGS. 3A and 3B together comprise a flow chart which depicts the general method of the present invention.
Figure 3B:
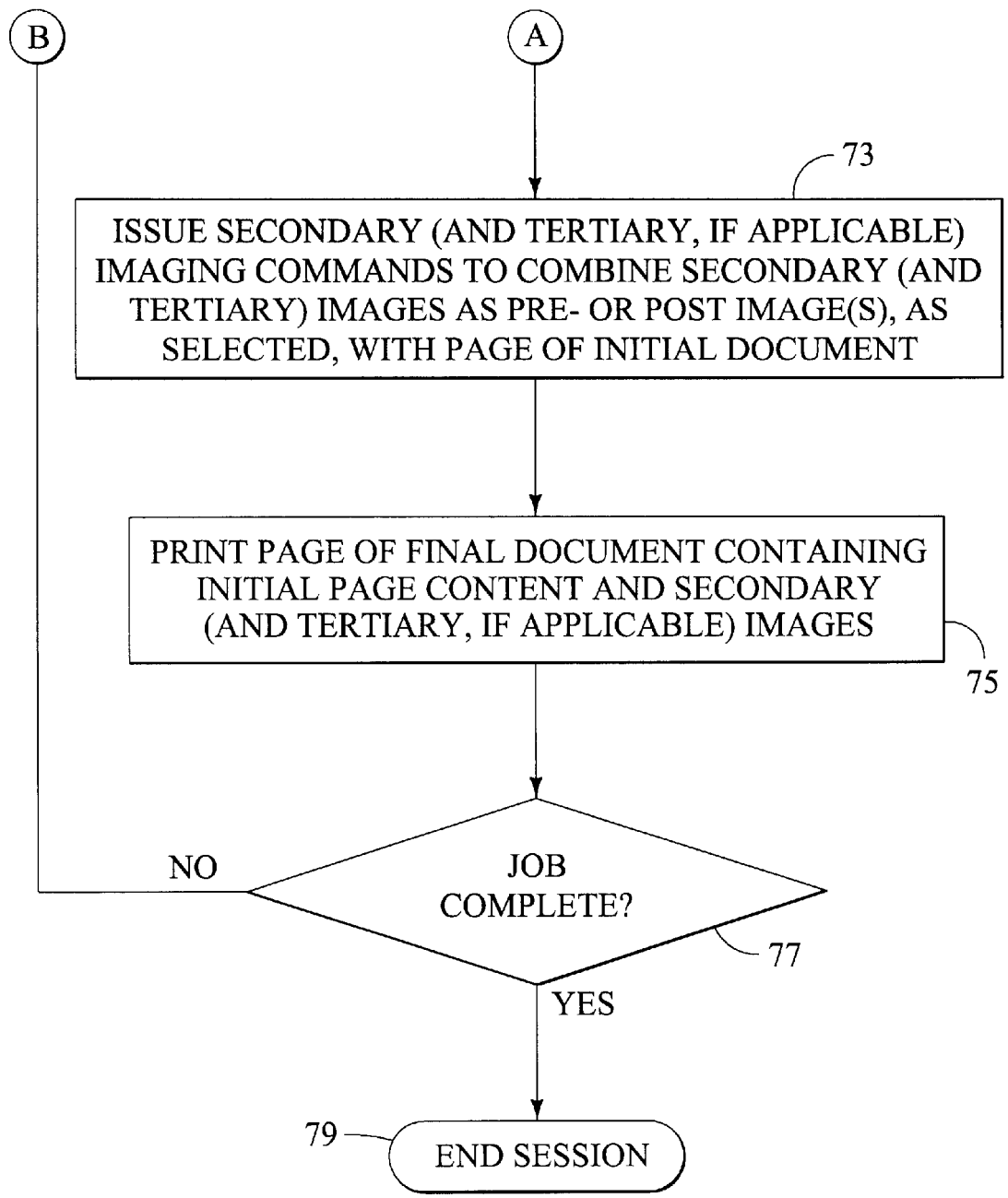

Turning now to FIGS. 3A and 3B, a flow chart is shown which depicts the general method of the present invention. The flow chart is generalized to cover both printing using a printer, or a photocopying process using a copier, as well as sending a facsimile with a fax machine. I will use the expression "printing device" to generically refer to all three devices. The session of imaging a secondary image onto an initial document begins at step 51. In step 53, the initial document is identified by the user. The initial document can comprise a computer file to be printed, or an already printed page or pages. At step 55 the user selects that portion of the initial document which will serve as the secondary image to be applied to subsequent portions of the initial document. The secondary image can comprise by way of example a selected page of the initial document, such as the first page, or a selected portion of a page, or a plurality of pages of the initial document.

The user next selects at step 57 whether the secondary image is to be applied to the initial document as a pre- or post-image. A pre-image applies the secondary image first to the final page, and then applies the page content of the initial page over the secondary image. In this way, the secondary image appears to lie behind the page content. This is commonly known as a watermark. A postimage applies the content of the initial document page first to the final document page, and then applies the secondary image over the page content. In this way, the secondary image appears to in front of the page content. This is commonly known as an overlay.

In step 59 the portion of the initial file identified as the secondary image is saved as a separate computer readable digital file to computer memory, either in a computer, printer memory, or copier memory. Preferably, the secondary image is saved as a macro, which, as described above, is a set of printer or copier instructions intended to print the secondary image, and especially to print the secondary image in an efficient manner. Where possible, the macro is saved in a configuration which allows the secondary image to be applied by the printing device in the most efficient manner.

As indicated at step 61, the method is not limited to applying only a single secondary image to subsequent pages of the initial document, but can also encompass applying a tertiary and further images to pages of the initial document. For example, a secondary image can comprise a watermark of "CONFIDENTIAL", and a tertiary image can comprise a company logo, both to be applied to subsequent pages of the initial document. When a tertiary image is to be used, the user selects that part of the initial document which will serve as the tertiary image at step 63. The user then selects at step 65 whether the tertiary image is to be applied as a pre- or a post-image, in the manner described above for the application of the secondary image. As with the secondary image, the tertiary image can comprise by way of example a selected page of the initial document, such as the first page, or a selected portion of a page, or a plurality of pages of the initial document. The portion of the initial document identified as the tertiary image is then saved as a separate computer readable digital file, preferably in the form of a macro, at step 67.

Where no tertiary image is to be applied, the method proceeds at step 69, where subsequent portions of the initial document (i.e., those portions exclusive of the secondary image and any tertiary image) are saved in computer readable memory as a primary image data file, being a digital file in computer readable file format. The primary image document file can be saved in computer readable memory within a computer, or preferably, is saved in computer readable memory resident within the printing device. As indicated, the primary image document file can comprise one or more pages, page "n" being the final page.

The printing of the final document containing the secondary (and additional images, if any) begins at step 71 with the first page of the final document to be printed. At step 73, the print/copy control program, which controls the process of generating the image of page of the final document for printing, copying or faxing, is initialized. The print/copy control program then retrieves from the computer readable memory and assembles, in the memory of the printing device, the page content of the first page of the initial document which is to contain the secondary image, the secondary image, and any tertiary image. The pre- or post-imaging position of the secondary (and tertiary) image is respected in assembling the page of the final document. Functionally, such pre- or post-imaging occurs in the configuration of the page of the final document as follows: If a secondary image is to be applied pre-image, the secondary image may occupy certain designated pixels within the pixel matrix which is recorded in the printer memory. Once the initial page content is applied to the pixel matrix, it may occur that a pixel previously occupied by the secondary image is now to be occupied by a pixel which makes up the initial page content. In this case, the pixel previously occupied by the secondary image content is overwritten by the page content. Likewise, in postimage processing, a pixel initially occupied by the page content will be overwritten with data from the post-image secondary image. Once the first page of the final document is assembled in the printing device memory as a final image file, the final image file is transmitted to the print engine of the printing device, where it is printed at step 75.

The program then checks at step 77 to determine if more pages are to be printed of the final document containing the secondary image. If so, the program returns to step 71 where it resumes the process for printing a page of the final document. If no more pages are to be printed with the secondary image, the program ends the print session at step 79.

Figure 4:
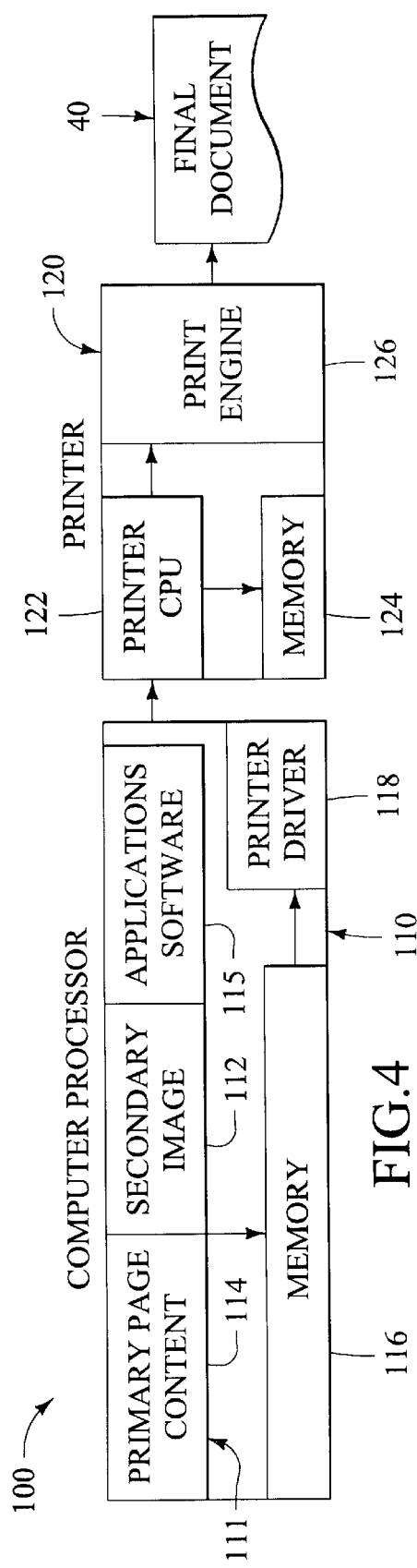
FIG. 4 is a schematic diagram which depicts a printing station configured to print watermarks and overlays in accordance with the method of the present invention.

Turning now to FIG. 4, a specific embodiment of a printing station 100 configured to implement the method of the present invention is shown. The printing station comprises a computer 110 and a printer 120. The computer can be for example a personal computer. The printer 120 can be for example a laser printer or an ink jet printer. The printer 120 is in electronic signal communication with the computer 110. The computer is provided with applications software 115 which can generate an initial document 111 such as a spreadsheet, a word processing document, a presentation document, and other documents of the like. The initial document 111 comprises a first portion 112, which is the secondary image to be applied to selected subsequent pages of the initial document. The initial document further comprises Ha second portion 114, being the subsequent pages of the document comprising the primary page content which generally varies from page to page of the document. The initial document from the applications software 115 is stored in the computer readable memory 116.

A user then instructs the computer 110 to print selected subsequent pages of the initial document with the secondary image. The selected pages can include some or all of the subsequent pages. The printing instructions are preferably controlled through the printer driver program 118 which configures the subsequent pages and the secondary image separate files in a file format compatible with the printer. Generally, the format for these files is known as a page description language, or "PDL". These files are then communicated to the printer 120 for printing. The printer driver program can either be accessed directly by the user, or it can be accessed through the applications software 115. Preferably, the printer driver program is configured to allow the user to select which pages of the initial document comprise the secondary image, which subsequent pages are to be printed with the secondary image, whether the secondary image is to be applied pre- or post-image to the subsequent pages, and to select attributes of the application of the secondary image to subsequent pages, such as the position on the final page, the shading to be applied, and other attributes. The printer driver program 118 is configured to transfer the separate files of the secondary image and the subsequent pages to the printer 120, rather than a single file of the initial document containing the secondary image on each selected subsequent page. Preferably, the secondary image file 112 is communicated to the printer 120 in the form of a macro. The printer driver program also transmits a set of instructions to the printer indicating how the secondary image is to be applied to the initial document (i.e., pre- or post-image, selected pages, page position, etc.).

The printer 120 receives the print instructions from the computer processor 110, along with the separate print files for the subsequent pages of the initial document and the secondary image. The printer is provided with its own computer processor unit 122 which allows the printer to manipulate image files and configure a final image to be printed via the printer 120 in accordance with the print instructions from the printer driver program 118. The printer computer processing unit ("CPU") 122 saves the subsequent page(s) document file and the secondary image file which it receives from the computer 110 in the printer memory 124.

The printer CPU also saves temporarily in the printer memory 124 the digital file representing a page or pages of final document image which is to be printed. The print engine then receives the digital file representing the page or pages of the final document, and causes them to be printed in tangible form as a page or pages of the final document 40.

Figure 5:
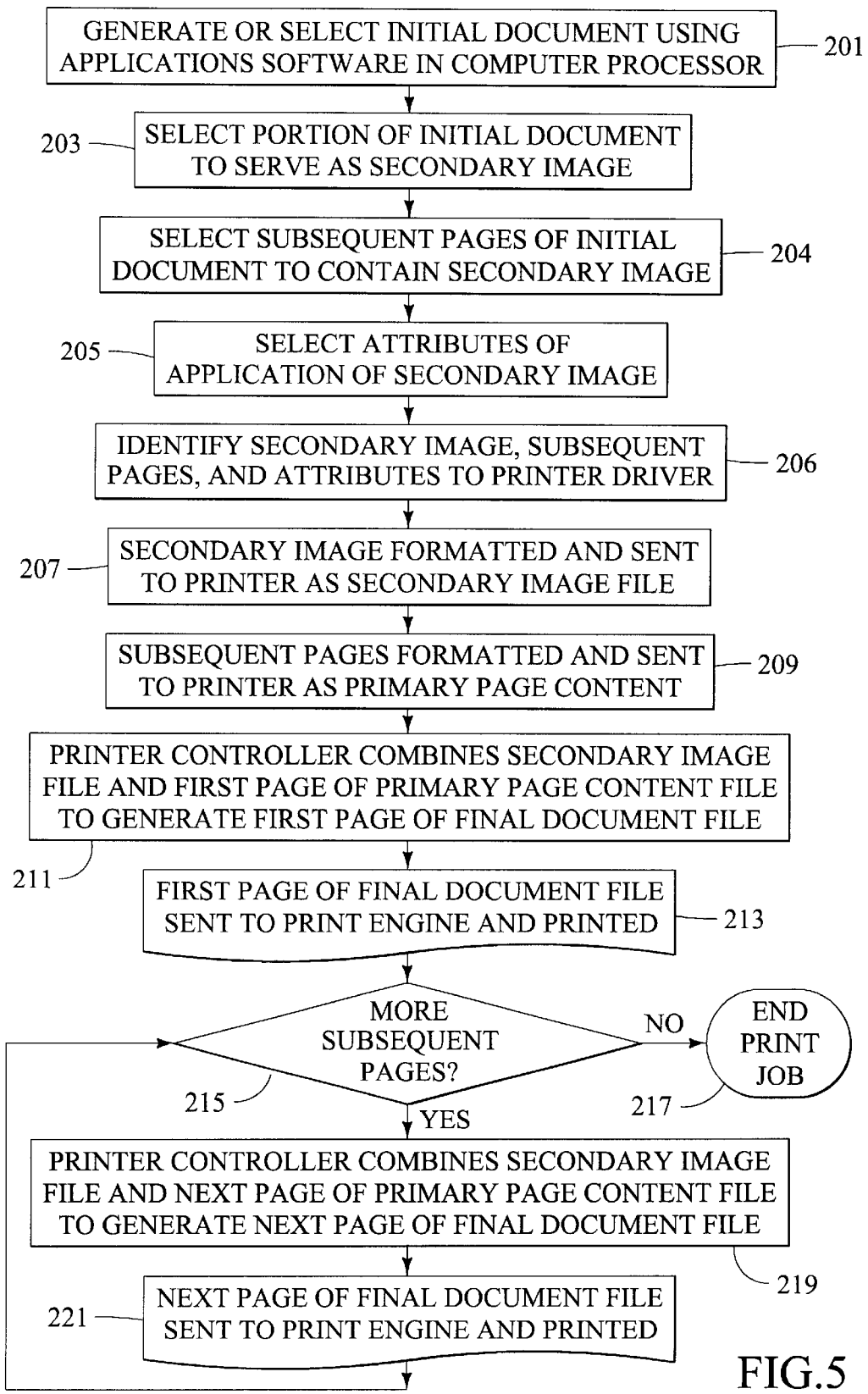
FIG. 5 is a flow chart which depicts the method of the present invention as applied to a printing process for the printing station of FIG. 4.

A process control flow chart for printing of a document using the printing station 100 of FIG. 4 is shown in FIG. 5. Turning to FIG. 5, in the first step 201 of the printing process, the user selects or generates an initial document in the computer processor (110 of FIG. 4) using applications software (115). This can consist of retrieving an existing file, or creating a new file. The user then selects at step 203 the portion of the initial document which comprises the secondary image to be applied to subsequent pages of the initial document. The subsequent pages to which the secondary image are to be applied are selected by the user at step 204, and the attributes of how the secondary image is to be applied to the subsequent pages (for example, pre- or post-image application, page position, shading, etc.) are selected at step 205. As described above with reference to FIG. 4, these attributes are preferably selected using the printer driver program (118 of FIG. 4). At step 206 the user identifies to the printer driver program the secondary image, the subsequent pages, and attributes selected in steps 203 through 205. It is understood that, in accordance with the general description depicted in FIGS. 3A and 3B, a tertiary image can also be identified within the initial document to be applied to the subsequent pages.

In step 207 the secondary image is formatted by the printer driver program in a format compatible with the printer (120 of FIG. 4), and is transmitted to the printer as a separate secondary image file. As described above, preferably the secondary image file is formatted in the form of a macro which can be efficiently executed by the printer to minimize the time the printer uses to configure the secondary image in the final print format. At step 209, the subsequent pages of the initial document are formatted by the printer driver program in a format compatible with the printer, and are transmitted as a separate primary page content file to the printer.

In step 211 of FIG. 5, the printer controller (122 of FIG. 4) combines the secondary image file with that portion of the primary page content file representing the first subsequent page of the initial document to which the secondary image is to be applied. This generates the first page (to which the secondary image is to be applied) of the final document. This page is then saved temporarily in the printer memory as a separate file, being the final document file (first page). It is understood that this file does not necessarily comprise the first page of the final document, but the first page to which the secondary image is to be applied. This "first page" of the final document is then transmitted to the print engine at step 213, where the printer (120 of FIG. 4) prints the "first page" of the final document (40 of FIG. 4). The printer controller then checks at step 215 to determine whether other subsequent pages of the initial document are also to be printed with the secondary image. If not, the secondary image printing process is stopped at step 217. It is understood that other pages of the initial document can still be printed, albeit without the secondary image.

If additional pages of the initial document are to be printed with the secondary image, the process continues at step 219. At this step the printer controller combines the primary page content file of the next subsequent page of the initial document (i.e., the next page which is to be printed with the secondary image) with the secondary image file to generate the print file for the next page of the final document. This next page file is then transmitted to the print engine for printing at step 221. The program control then returns to step 215 to determine whether more pages of the initial document are to be printed with the secondary image.

It is to be appreciated that the process steps in the flow chart of FIG. 5 do not necessarily need to be executed in the order shown. For example, the order of the selection of the secondary image and selected subsequent pages within the initial document at steps 203 and 204 can be reversed. Likewise, the printer controller can be configured to assemble each page of the final document and save the assembled document in the printer memory before transmitting any page to the print engine for printing.

The printing of subsequent pages of the initial document which are not selected for printing with the secondary image can be performed in between printing final document pages with the secondary image. For example, if the user selects to print only odd numbered pages with the secondary image, the printing of even numbered pages without the secondary image can occur between the printing of the odd numbered pages with the secondary image. Preferably, the method proceeds by sequentially printing the subsequent pages of the initial document. If a subsequent page is selected to have the secondary image applied to it, the process of steps 211 or 213 occurs. If the secondary image is not to be applied to a subsequent page, step 211 (or 213 for latter subsequent pages) is modified so that the secondary image file is not combined with the primary page content file, and only the contents of the primary page content file are printed. This can be accomplished by adding decision elements to the flow chart prior to steps 211 and 213. The decision element queries whether or not the secondary image is to be applied to the next sequential page. If "yes", step 211 (or 213) occurs as shown; if not, control would branches to a step where the final document page file defaults to the primary page content file. Control would then resume at step 213 (or 219, respectively).

The invention thus further includes a printing station for printing pages of a document with a secondary image identified within the document, and in accordance with the method of the present invention.

Figure 6:
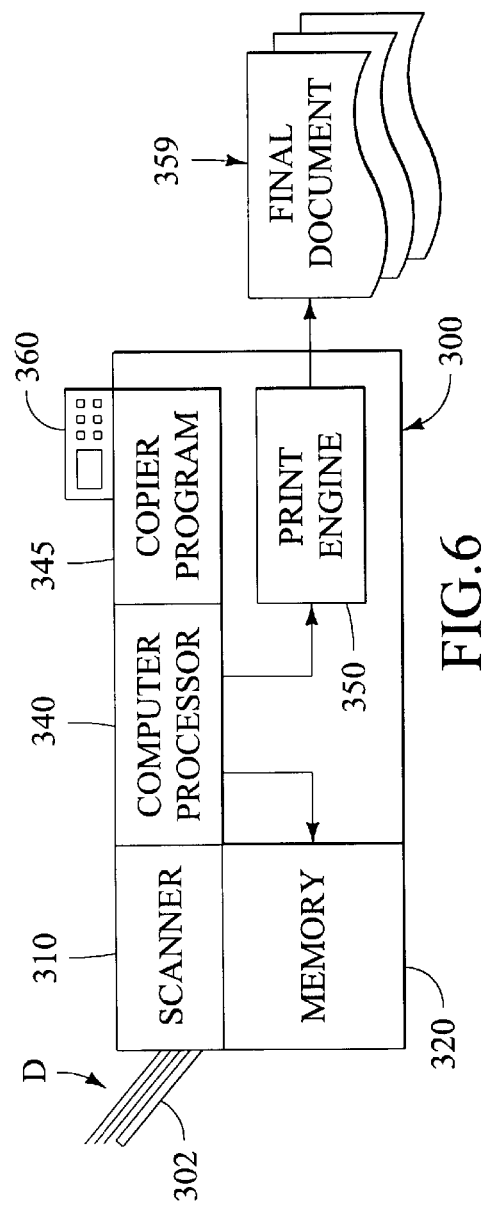
FIG. 6 is a schematic diagram which depicts a copying station configured to make copies having watermarks and overlays in accordance with the method of the present invention.

Turning now to FIG. 6, a specific embodiment of a photocopier ("copier") 300 configured to implement the method of the present invention is shown. The copier includes a document feed tray 302 into which an initial multi-page document "D" to be copied can be placed by the user. At least one page of the initial document "D" can consist of a secondary image to be applied to selected other (i.e., "subsequent") pages of the initial document. The selected subsequent pages can include some-or all of the remaining pages of the initial document. The copier 300 further includes a user interface station 360 to allow the user to instruct the copier to make copies having the secondary image printed on selected pages of the final copy product. The user interface 360 can be located on the copier itself, or it can be located elsewhere, as for example in software in a personal computer in electronic communication with the copier 300. Through the user interface 360, the user identifies to the copier the source of the secondary image. The user interface interacts with a copy control program 345, which can be resident within the copier itself, or which can reside in a computer in electronic communication with the copier. The copier control program 345 is preferably configured to allow the user to select the manner in which the secondary image is to be applied to the subsequent pages of the initial document "D".

The secondary image can be in the form of a file in a computer connected to the copier 300, or it can comprise a page of the initial document "D" which is to be placed in the document feed tray 302. In one embodiment, the secondary image comprises the first page of the document "D" which the user places in the document feeder 302. In another embodiment, the first and second pages of the initial document "D" can comprise secondary and tertiary images to be applied to the remainder of the pages of the initial document.

A copier computer processor 340 receives the instructions from the copier program 345, and controls the acquisition of the secondary image, and its application to the selected pages of the initial document. Once the user has selected the secondary image, and the manner in which it is to be applied, the copying process begins. The copier feeds each sheet of the initial document "D" from the feed tray 302 through a scanner 310, which scans each page of the initial document and saves the scanned image in a computer readable file format in the computer readable copier memory 320. The secondary image is also stored in the copier memory 320 in the form of a secondary image file, and more preferably in the form of a macro which can be executed by the copier computer processor 340. The copier computer processor 340 then reads from the copier memory 320 a first page of the initial document to which the secondary image is to be applied, and combines the first page file with the secondary image file to assemble a first page of the final document in a computer readable file format. This file of the first page of the final document is preferably saved in the copier memory, and is then directed to the copier print engine 350 via the copier processor 340. The print engine 350 causes the file of the first page of the final document to be printed in final form 359. This process continues for each page of the initial document which is to be copied with the secondary image until all of the copying is complete. When multiple copies are to be made, the copier can save the assembled image file of the final page in the copier memory 320 until the number of designated copies of that page have been printed.

In one example, the document placed in the feed tray 302 comprises a first page which includes the secondary image. This secondary image is to be applied to the remaining pages of the initial document to produce the final copy product. The user identifies this situation to the copier program 345 through the user interface 360. The copier then proceeds to scan the first page using the scanner 310, and saves the resulting image as a separate secondary image file in the copier memory 320. The copier then proceeds to scan the subsequent pages of the initial document, digitizing each one and saving each page as a file in the copier memory 320. As each subsequent page is scanned and saved as a file, the copier processor 340 combines the secondary image file with the subsequent page file, in the manner directed by the user, to construct a finished document page file. Each finished document page file is then communicated to the print engine 350, where it is printed as a page (or multiple copies of a page) of the final document 359.

Figure 7A:
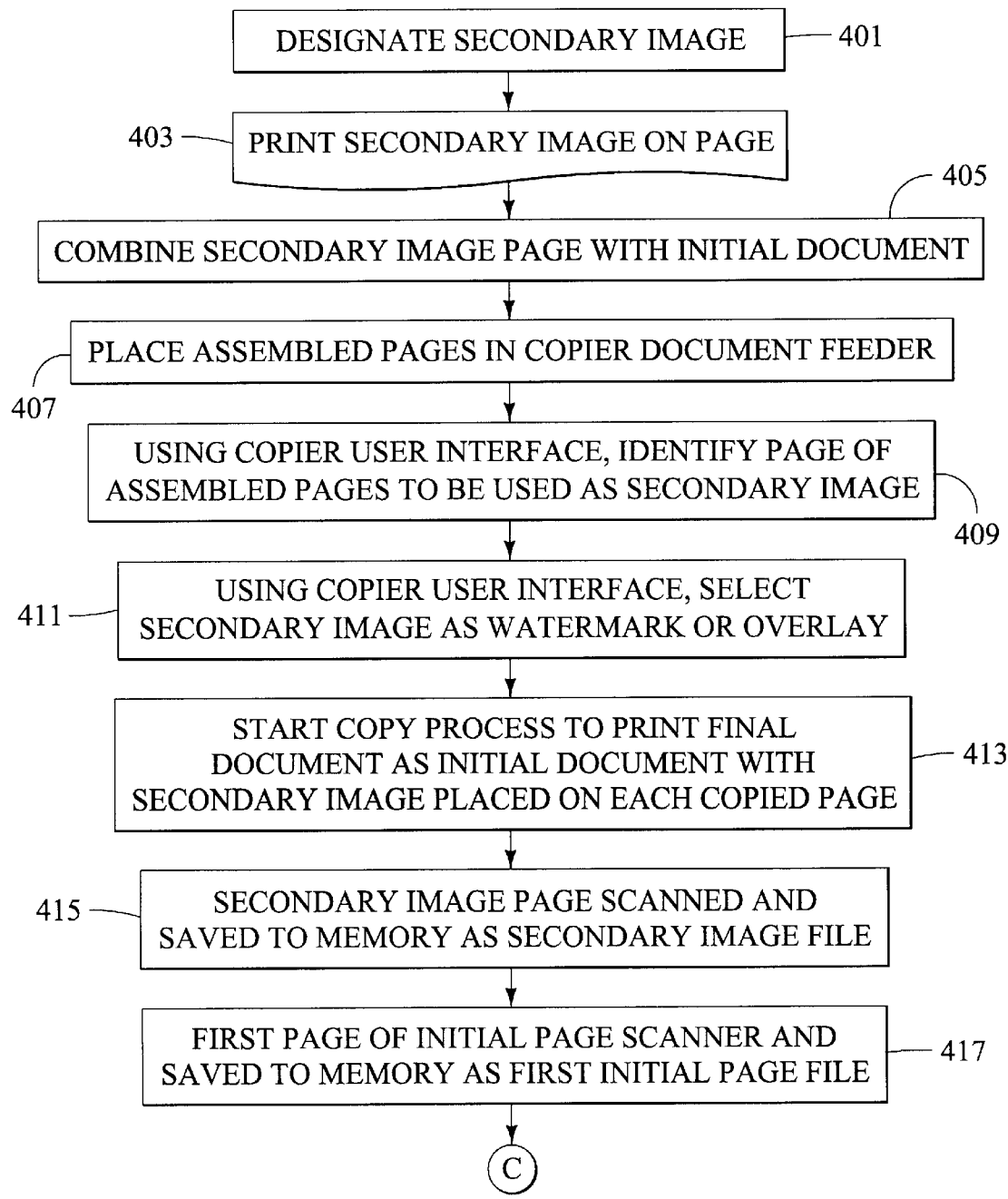
FIGS. 7A and 7B together comprise a flow chart which depicts the method of the present invention as applied to a copying process for the copying station of FIG. 6.
Figure 7B:
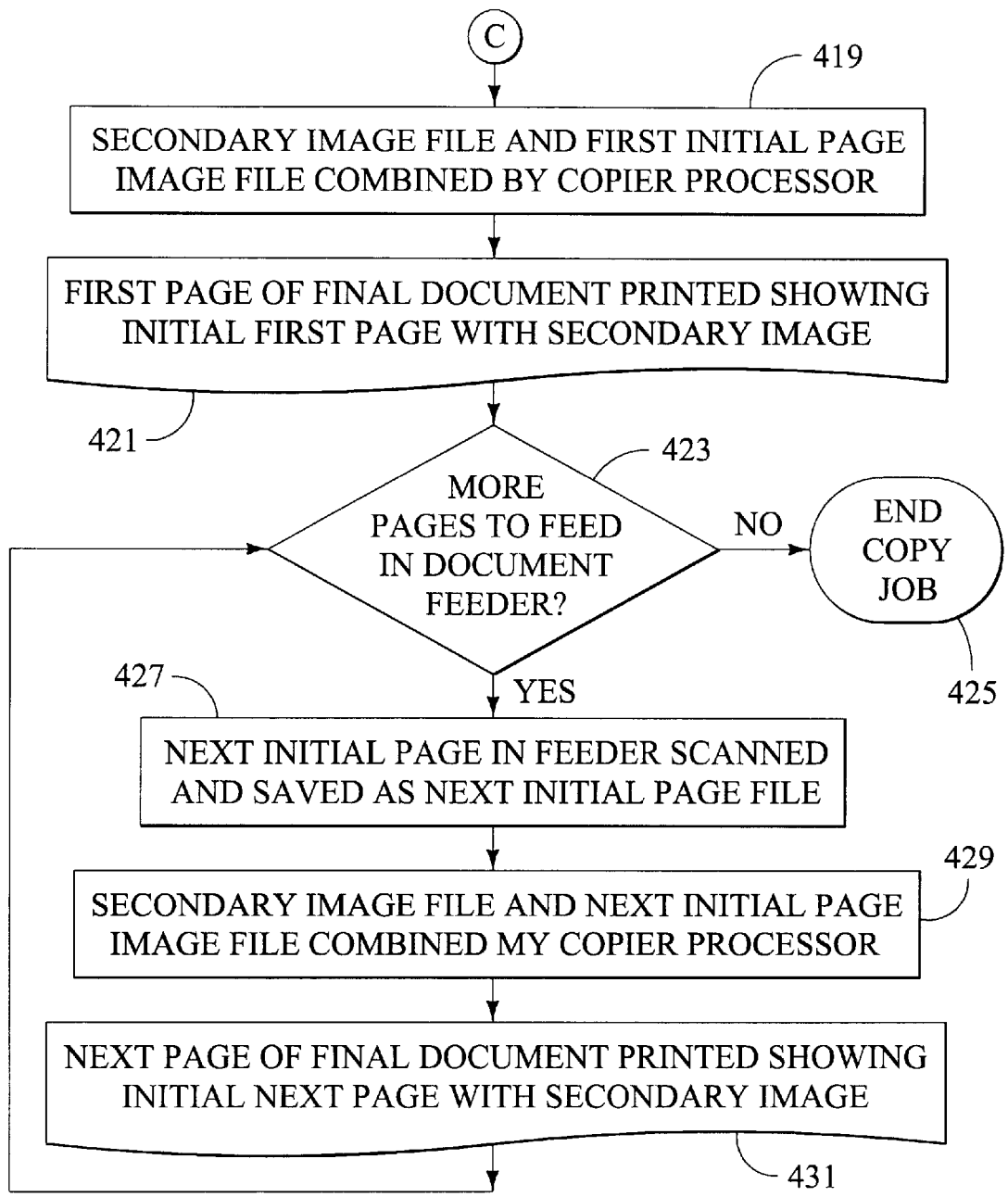

A process control flow chart for one embodiment, and a specific example of the embodiment, of a method of applying a secondary image to an initial document which is to be photocopied, using the copier 300 of FIG. 6, is shown in FIGS. 7A and 7B. Turning to FIG. 7A, in the first step 401 of the copying process, the user designates the secondary image, which as discussed, can either a separate computer readable file, or can comprise a page of a document to be copied. In the embodiment and example shown, when the secondary image is a computer readable file, the secondary image can be separately printed in tangible form using a printer, as indicated at step 403, and then combined with the balance of the initial document to be placed in the document feeder tray (302 of FIG. 6), as indicated at steps 405 and 407 of FIG. 7A.

At step 409 of FIG. 7A, and in the particular embodiment shown, the user identifies from the user interface (360 of FIG. 6) the page of the initial document which is to be used as the secondary image. Typically this page will be the first page of the document placed in the document feeder (302 of FIG. 6). In an alternate embodiment wherein the secondary image comprises a computer file, at step 409 the user identifies to the copier the file to be used as the secondary image and the file location. Once the source of the secondary image has been identified at step 409, at step 411 the user informs the copier program (345 of FIG. 6) whether the secondary image is to be applied pre- or post image to the subsequent pages of the copy (i.e., whether the secondary image should be applied so as to appear in the background or the foreground of the primary page content of the pages of the which the secondary image is to be applied). At this step, the user can also designate to the copier control program other attributes to be applied to the secondary image (for example, the location of placement on the pages of the final copy, shading or coloration of the secondary image, and so forth), as well as the number of copies of the final document to be made, and whether they are to be collated, sorted, stapled, and other standard copying options.

Once the secondary image and its manner of application are specified as described above, the user initiates the copy process at step 413. For the specific embodiment being discussed, wherein the secondary image comprises a page of the initial document placed in the document feeder tray (302 of FIG. 6), at step 415 of FIG. 7A the page identified as containing the secondary document is scanned by the scanner (310 of FIG. 6), the page contents are digitized, and the resulting computer readable file, designated as the secondary image file, is stored in the copier memory (320 of FIG. 6). It should be appreciated that the secondary image file can be stored in a computer memory outside of the copier itself, and remotely accessed by the copier processor (340 of FIG. 6) as needed subsequently in the copying process.

Next, as indicated at step 417 of FIG. 7A, the first page of the initial document which is to be provided with the secondary image is scanned by the scanner (310 of FIG. 6). The scanned initial page is digitized, and is saved in the copier memory (320 of FIG. 6) as the first initial page file. Alternately, if the page is to be printed without the secondary image, the scanned digitized image of the initial page can be provided directly to the printer without being saved in the copier memory. However, where the secondary image is to be applied, at step 419 of FIG. 7B the secondary image file and the first initial page file are combined by the copier processor (340 of FIG. 6) to generate a computer readable digital representation of the first page of the final copy, which is preferably temporarily saved as the first final page file in the copier memory. At step 421, the first final page file is communicated by the copier processor (340 of FIG. 6) to the print engine (350 of FIG. 6) where it is printed as the first page of the final copy (359 of FIG. 6).

Subsequently, the copier control program checks at step 423 to determine whether there are subsequent pages of the initial document which are to be copied with the secondary image. If not, the secondary-image copy process is terminated at step 425. However, if there are remaining pages in the document feeder (302 of FIG. 6) which are to be copied and provided with the secondary image, then the copier control program proceeds to step 427 of FIG. 7A, and the next page of the document to be copied is scanned and saved as a "next initial page file" in the manner described above for the first initial page. Then the secondary image file is combined with the next initial page file, and the resulting next final page file is printed ("copied") in the manner described above. The control program then returns to step 423, and the process is repeated until the last initial page to be provided with the secondary image is copied.

The invention thus further includes a copier for copying an initial document with a secondary image, in accordance with the method of the present invention. It is to be appreciated that the process depicted in the flow chart of FIGS. 7A and 7B is but one implementation of a copy process incorporating the method of the present invention, and that other copy processes within the scope of the present invention can also be implemented. For example, the secondary image can be accessed from a computer memory which is in electronic communication with the copier, and thus steps 403 and 405 can be eliminated, and step 409 modified to allow the user to select an image file, rather than a page of the initial document, as the secondary image. Step 415 would also be modified in this case if the secondary image is acquired from a computer file to show such acquisition, rather than scanning the secondary image as indicated.

Further, the steps of the copying process shown in FIGS. 7A and 7B do not necessarily need to be performed in the order shown. For example, step 421, wherein a first page of the final document is printed ("copied") before the second page of the initial document is scanned at step 427, can actually be performed after the second and subsequent pages are scanned, if the first initial page is temporarily stored in the copier memory.

For the embodiment wherein an initial document is to be provided with a secondary image during a fax process, the apparatus resembles that of FIG. 6, and the process resembles that depicted in the flow chart of FIGS. 7A and 7B, except that the final document is not printed, as depicted at 359 of FIG. 6, but is instead transmitted to a receiving facsimile machine. From the receiving facsimile machine the final document can either be printed or saved to computer readable memory.

Figure 8:
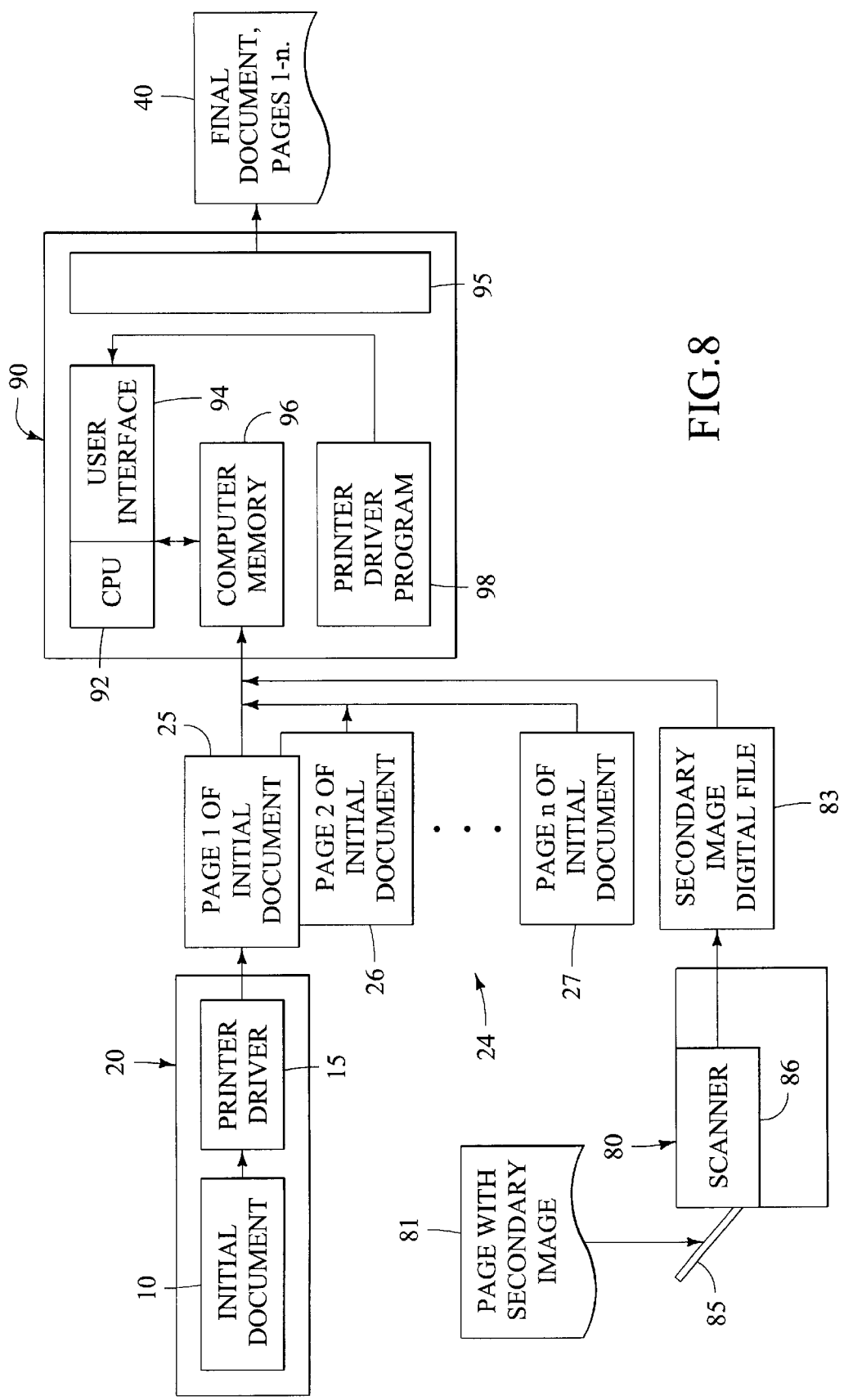
FIG. 8 is a schematic diagram depicting an alternate watermark printing process using a scanner/copier and a printer, in accordance with the method of the present invention.

Yet a third embodiment of the invention is shown in FIG. 8. In the embodiment shown in FIG. 8, a printer 90, which can be considered a "smart printer", is provided with a central processing unit ("CPU") 92, and a user interface 94. The printer 90 is also provided with computer memory 96, a printer driver program 98, and a print engine 95. An initial document 10, to be printed with a secondary image, is compiled within computer 40 using applications software (not shown). The initial document 10 is provided to the smart printer 90 in the form of a digital file 24, representing the first page 25, and any subsequent pages 26, 27, of the initial document. The computer can also have a printer driver program 15, but this is not essential as the printer driver program 98 in printer 90 can perform all of the necessary operations for this embodiment of the invention.

The third embodiment also comprises scanner/copier 80. Scanner/copier 80 can be a simple document scanner which is configured to scan a tangible document and convert it to a digital image, or it can include a photocopier which includes a document scanner and which provides a digital output for the scanned, digitized tangible document. In the embodiment shown in FIG. 8, the tangible document is placed in document feed tray 85, and is then scanned by the scanner 86, which scans the document 81 and converts it to a digital form, represented by secondary image digital file 83.

Both the initial document 10 from the computer 20, and the secondary image digital file 83 are then provided to the smart printer 95, and are stored in computer memory 96. Through the user interface 94 of the smart printer 90, the user can designate the source of the initial document, the source of the secondary image, and the manner in which the secondary image is to be applied to the initial document, in the manner described above for the first and second embodiments of the invention. The smart printer 90, through the CPU 92 and the printer driver program 98, then combines each file of the final document file 24 which is to contain the secondary image, with the secondary image file 83, to assemble the final document page files which are temporarily stored in the computer memory 96. The final document page files are provided to the print engine 95, and are printed in tangible form as final document 40. To facilitate printing of the final document, each page of the final document is preferably provided to the print engine 95 after the final page has been assembled, rather than waiting until all of the final pages have been assembled.

As described above for alternate embodiments of the invention, through the user interface 95 of the smart printer 90, the user can designate which pages of the final document are to be provided with the secondary image (e.g., all pages or only odd numbered pages). Further, a tertiary image can be included as a second tangible page to be scanned by the scanner/copier 80, and the user can designate, through the user interface 94 of the smart copier 90, which specific pages comprises the secondary and the tertiary images, and the manner in which they are to be applied to the final document. For example, the secondary image can be designated for application to odd numbered pages of the initial document, and the tertiary image can be designated for application to even numbered pages of the initial document.

In a first variation on the third embodiment of the invention, the initial document is the document placed in the document feed tray 85 of the scanner/copier 80. In this variation, the secondary image is provided by the computer 20, in the manner described above for the first embodiment. Preferably, the user interface 94 of the smart printer 90 is configured to allow the user to select the source, i.e., either the computer 20 or the scanner/copier 80, as the location from which either the initial document and the secondary image are provided. Following the source selection, the final document is compiled and printed in the manner described above for the third embodiment of the invention.

In a second variation on the third embodiment of the invention, the apparatus only comprises the scanner/copier 80 and the smart printer 90 shown in FIG. 8, and the computer 20 does not need to be provided. In this first variation, both the initial document and the secondary image are provided as the tangible document which is placed into the document feed tray 85, and subsequently provided to the scanner 86. The digitized file from the scanner/copier 80, which is provided to the smart printer 90, comprises separate page files for both the secondary image, and, preferably, each page of the initial document. The identification of the pages of the file of the scanned, digitized file which comprises both the initial document and the secondary image can be provided to the smart printer 90 through the user interface 94. Subsequently, the smart printer can apply the secondary image to the selected pages of the initial document, and print the final document in the manner described above.

Yet a third variation of the third embodiment of the invention essentially comprises a combination of the first embodiment of the invention and the second variation of the second variation of the third embodiment. In this third variation, the apparatus shown in FIG. 8 is modified such that both the initial document and the secondary image are provided as the tangible document which is placed into the document feed tray 85, and subsequently provided to the scanner 86, and the scanned, digitized file, which comprises both the initial document and the secondary image, is provided to the computer 20 through a port, such as a parallel port or a serial port. The user can then identify through the computer which portions of the file comprise the initial document, and which portions comprise the secondary image. The identified portions are then provided to the printer in the manner described above for the first embodiment of the invention. In this third variation, the printer 90 does not need to be a "smart printer" (i.e., provided with the CPU 92 and the printer driver program 98 of FIG. 8), since these functions can be performed by the computer 20.

It is thus apparent that using a printer driver, and a user interface, in conformity with the present invention, a watermark can be applied to a document when the software (if any) used to generate the initial document does not provide watermark capability. Further, the present invention allows for a secondary image to be applied to an initial document as a watermark, when no application software is used to generate either the initial document or the secondary image.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for generating a secondary image contained within an initial document onto a subsequent portion of the initial document to generate a finished document to be produced by a document producer, comprising:

identifying a first body of data within the initial document to be used as the secondary image;

identifying a second body of data within the initial document to be used as the subsequent portion of the initial document;

providing the initial document to the document producer as a selected one of data file or a tangible document form;

formatting the initial document into an initial digital document file capable of being processed by the document producer into at least part of the final document;

storing in a computer readable memory the portion of the initial digital document file comprising the first body of data as a secondary image data file;

storing in the computer readable memory a portion of the initial digital document file comprising the second body of data as a primary image data file;

selectively combining, within the document producer, the secondary image data file and at least a portion of the primary image data file using a computer processor to generate a digital representation of at least one page of the finished document; and generating, using the document producer, the at least one page of the finished document in final form from the digital representation of the at least one page of the finished document.

2. The method of claim 1 wherein the document producer is a printer.

3. The method of claim 1 wherein the document producer is a copier.

4. The method of claim 1 wherein the secondary image data file is selectively combined with the at least a portion of the primary image data file to produce the secondary image as a watermark.

5. The method of claim 1 wherein the secondary image data file is selectively combined with the at least a portion of the primary image data file to produce the secondary image as an overlay.

6. The method of claim 1 wherein the initial document is produced by a selected applications software program.

7. The method of claim 1 wherein the initial document comprises a plurality of pages, and further wherein the first body of data comprises the first page of the initial document, and the second body of data comprises at least one subsequent page of the initial document.

8. An apparatus for generating a secondary image contained within an initial document onto a subsequent portion of the initial document to produce a finished document page, comprising:

a computer processor comprising an applications software program configured to generate the initial document, computer readable computer memory, and a printer driver program;

a printer comprising a printer control processor, computer readable printer memory, and a print engine configured to print the finished document, the printer being in electronic communication with the computer processor; and wherein the printer driver program comprises a series of computer executable steps for communicating a first portion of the initial document identified as the secondary image from the computer processor to the printer memory as a secondary image computer readable file, and communicating a second portion of the initial document identified as the subsequent portion of the initial document from the computer processor to the printer memory as a page content computer readable file; and wherein the printer control processor is configured to read from the printer memory the secondary image computer readable file and at least a portion of page content computer readable file, to selectively combine the secondary image computer readable file and the at least a portion of the page content computer readable file to generate a digital representation of the finished document page, and to transmit the digital representation of the finished document page to the print engine for printing as the finished document page.

9. The apparatus of claim 8 wherein the secondary image is separately saved in the printer mercury in the form of a macro comprising a series of computer executable steps for execution by the printer control processor.

10. The apparatus of claim 8 wherein the secondary image comprises the first page of the initial document.

11. The apparatus of claim 8 wherein the printer control processor is further configured to selectively combine the secondary image computer readable file and the at least a portion of the page content computer readable file to reproduce the secondary image as a watermark on the at least one page of the finished document.

12. The apparatus of claim 8 wherein the printer control processor is further configured to selectively combine the secondary image computer readable file and the at least a portion of the page content computer readable file to reproduce the secondary image as an overlay on the at least one page of the finished document.

13. The apparatus of claim 8 wherein:

the applications software program is further configured to generate a tertiary image within the initial document to be generated onto the subsequent portion of the initial document to produce the finished document page;

the printer driver program further comprises a series of computer executable steps for communicating a third portion of the initial document identified as the tertiary image from the computer processor to the printer memory as a tertiary image computer readable file; and the printer control processor is further configured to read from the printer memory the tertiary image computer readable file and to selectively combine the tertiary image computer readable file and the at least a portion of the page content computer readable file to generate the digital representation of the finished document page containing the selectively combined secondary image, the tertiary image, and the subsequent portion of the initial document.

14. A copier for reproducing an image from a selected first page of a multi-page document onto a subsequent page of the document to thereby produce a finished document page, comprising:

a scanner configured to scan a page of the document containing page content and convert the scanned page content into a distinct digital file;

computer readable memory configured to store digital files of page content;

a sheet feeder configured to sequentially feed a plurality of sheets of the multi-page document to the scanner;

a print engine configured to print the finished document page;

a computer processor configured to send and retrieve digital files from the computer readable memory and execute steps of a computer program; and a copier program comprising a series of computer executable steps for reading from the computer readable memory, and selectively combining, the digital files of the selected first page and the subsequent page of the multi-page document to produce the finished document page, and to transmit the finished document page to the print engine for printing.

15. The copier of claim 14 wherein the copier program is resident in a computer external to the copier, the computer being in electronic communication with the copier.

16. The copier of claim 14 wherein the copier program is further configured to selectively combine the digital file of the selected page of the multi-page document with digital files of additional subsequent pages of the multi-page document.

17. The copier of claim 14 wherein the copier program is further configured to selectively combine the digital file of the selected page of the multi-page document with the subsequent page to reproduce the page content of the selected page as a watermark on the finished document page.

18. The copier of claim 14 wherein the copier program is further configured to selectively combine the digital file of the selected page of the multi-page document with the subsequent page to reproduce the page content of the first page as an overlay on the finished document page.

19. The copier of claim 14 further combining a user-accessible control panel to allow the user to enable and disable the series of computer executable steps in the copier program for selectively combining the digital files of the selected page and the subsequent page of the multi-page document.

20. The copier of claim 19 wherein the user-accessible control panel is configured to allow the user to select between combining the first page of the multi-page document as a selected one of a watermark or an overlay on the subsequent page of the multi-page document.

* * * * *

UNITED STATES PATENT AND TRADEMARK OFFICE
CERTIFICATE OF CORRECTION

PATENT NO. : 6,765,688 B1
DATED : July 20, 2004
INVENTOR(S) : Claiborne

It is certified that error appears in the above-identified patent and that said Letters Patent is hereby corrected as shown below:

Column 10,
Line 22, delete "Ha" and insert in lieu thereof -- a --;

Column 12,
Line 35, delete "branches" and insert in lieu thereof -- branch --;

Column 13,
Line 13, after "can" insert -- be --;

Column 14,
Line 20, after "of" delete "the".

Signed and Sealed this

Twenty-sixth Day of July, 2005

JON W. DUDAS
*Director of the United States Patent and Trademark Office*